J. O. NASLIN.
DOOR CHECKING DEVICE.
APPLICATION FILED MAY 31, 1921.

1,399,145.

Patented Dec. 6, 1921.
2 SHEETS—SHEET 1.

INVENTOR
John O. Naslin

J. O. NASLIN.
DOOR-CHECKING DEVICE.
APPLICATION FILED MAY 31, 1921.

1,399,145.

Patented Dec. 6, 1921.
2 SHEETS—SHEET 2.

Inventor
John O. Naslin

UNITED STATES PATENT OFFICE.

JOHN O. NASLIN, OF SEATTLE, WASHINGTON.

DOOR-CHECKING DEVICE.

1,399,145.

Specification of Letters Patent.

Patented Dec. 6, 1921.

Application filed May 31, 1921. Serial No. 474,016.

*To all whom it may concern:*

Be it known that I, JOHN O. NASLIN, a citizen of the United States, residing at 415 Taylor avenue, Seattle, in the county of King and State of Washington, have invented a new and useful Door-Checking Device; and I do hereby declare that the following is a full and exact description thereof, reference being had to the accompanying drawings and to the characters and references marked thereon.

My invention relates to the same door check for which application for Letters Patent was filed by me July 7, 1920, Ser. No. 394459, now abandoned, which is designed for use to check doors to prevent slamming, operative by a door and the like, so as to check its velocity when swift, and to permit its free closure when its movement is slow. With the novel parts of this device experiments began at the time experiments were being made with the ones referred to in said application, which were at the time considered of such small or practical value, as not to be worth patenting, but later experiments have, however, proven that by some few improvements, as to modes of constructions, this device with fewer and simpler parts, can be manufactured at a very small cost and will serve the same purpose as the other two referred to.

Figures 1, 5, 8, 11, 14 and 17 are front views of the device with the front portion of the casing removed, where the perpendicular position of the check and the mechanism of the device is indicated by solid lines, and the check, as positioned when swung out into the path of the door, is indicated by dotted lines.

Figs. 2, 4, 6, 9, 12 and 15 are side views of the device facing the door, where through the opening of the casing, which on this side is left in the main open for the movements of check 4 and member 10, the mechanism of the device is exposed to view.

Figure 19:
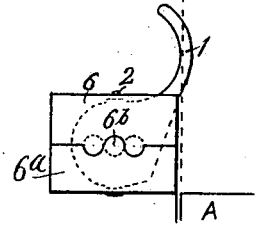

Figs. 3, 7, 10, 13, 16 and 18 are top views of the device where the top part of the casing is removed, and the mechanism of the device is seen from the top; and Fig. 19 is a top view of the device incased, showing the lap-joints of the casing.

In the several figures the same numbers and characters refer to the same parts.

The casing, which I have provided for the device, consists of two parts, "6 and 6ª," which have openings with stops for the positioning and movements of the striker 1 and check 4, hereafter described, and can by turns be used for front and back, as may be required for right and left side purposes, and are so constructed, that on a straight line drawn through the casing, the sides and ends of both portions, meet and evenly fit together, and by means of lap-joints, as at 6ᵇ, and by suitable screws through openings "8 8," the mechanism of the device is held in a fixed position, when attached to the door jamb.

Check 4, which should be of some resilient material that produces a recoil, is firmly fixed to strap 3, and the latter is mounted upon pivot 2, which can be driven or screwed into the door jamb without a casing, but it will stay in position and support the device better, when it is run through the front and back plates of the casing, as indicated on the drawings; where it is seen that the resilient check 4 is suspended from pivot 2 by strap 3 in the casing "6 6ª," outside of the swing of door A, so as to reach into the latter's swinging path, to check by recoil its closing movement, when by means of what will be termed actuating member 10, it is swung out from its perpendicular position through the openings provided in said casing, to that indicated by dotted lines in Figs. 1, 5, 8, 11 and 14.

Figure 1:
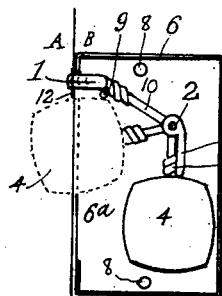
Figure 2:
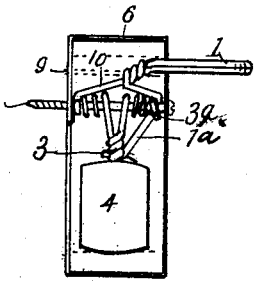
Figure 3:
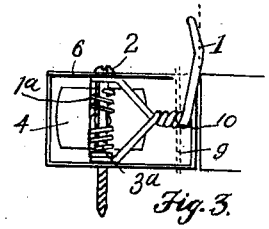
Figure 4:
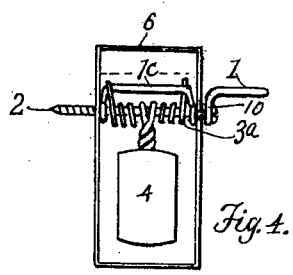
Figure 5:
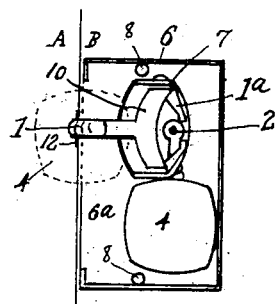
Figure 6:
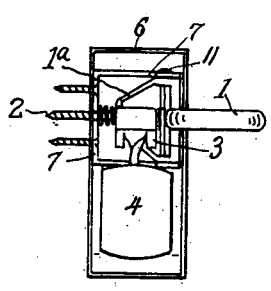
Figure 7:
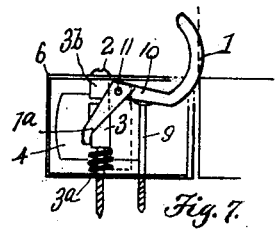
Figure 8:
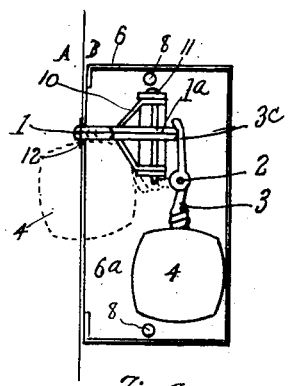
Figure 9:
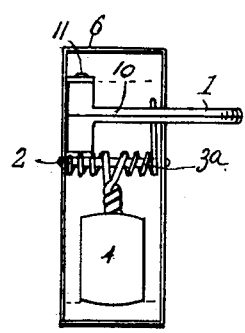
Figure 10:
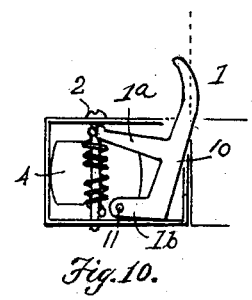
Figure 11:
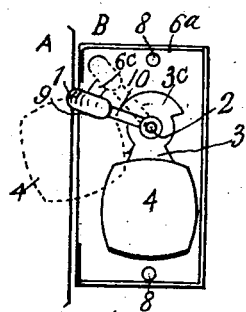
Figure 12:
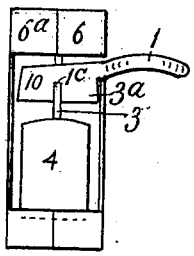
Figure 13:
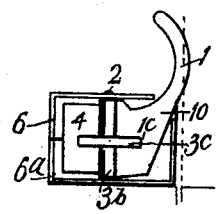
Figure 14:
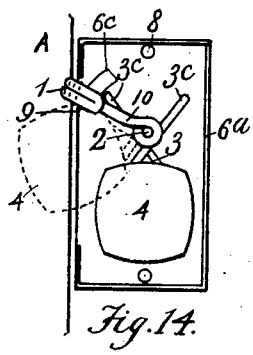
Figure 15:
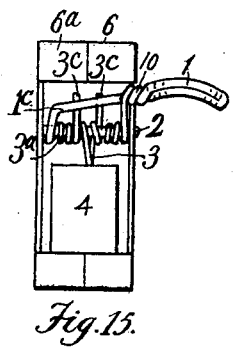
Figure 16:
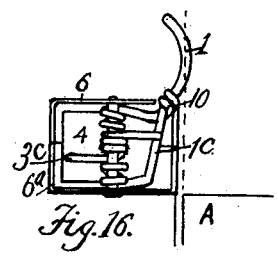
Figure 17:
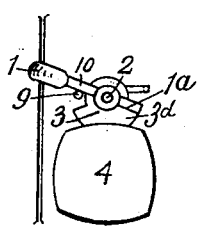
Figure 18:
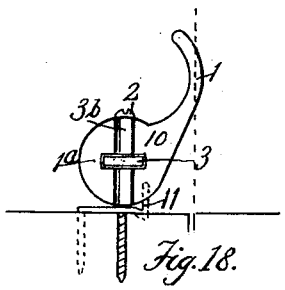

Spiral spring- and collar-guards, which I have provided upon pivot 2 for keeping strap 3 in proper place upon said pivot, may be formed out of strap 3, as at 3ª, or it may be formed out of member 10, as at 3ᵇ, or it may be formed independent of said strap and member, as at 3ª and 3ᵇ in Fig. 7, in either case, whether these guards form a part of strap 3 or of member 10, or form separate parts of said strap and member, they should be of such material and construction, and adapted to maintain said strap upon said pivot so that the check 4 can swing clear of the door jamb and the sides of the casing.

Said strap 3 and member 10 are both constructed so as to be used for right and left hand purposes by merely being removed from their pivots and reversed in position, as may be required for right and left hand swinging doors. This member 10 is mounted upon pivot 2, except as shown in Figs. 5 to 10, inclusive, where it is mounted upon pivot 11 supported by bracket 7, and it has a striker 1, so shaped and extended into the path of the door A, as to be engaged by plate 12, fastened onto to the edge thereof for wearing protection, so as to be easily pressed out of the latter's swinging course, and is further provided with actuating reaches, as at 1ª 1ª, and contact abutments, as at 1ᶜ 1ᶜ, suitably positioned and adapted to engage and actuate strap 3, which is for that purpose adapted, as at 3ᶜ and 3ᵈ in such a manner, that when the door is moving swiftly and thereby said striker is quickly hit, the check 4 is swung out from its suspended position into the path of the closing door, with one or more resulting recoils, until the movement of the door is slowed down so much, that its contact with striker 1 will at last not be sufficiently forceful to cause check 4 to swing into its path, but merely presses the striker 1 to the side without raising check 4, as it finally passes to a closed position without any slamming.

These results can be obtained by means of this device in any of the modified forms of constructions herein shown and described; wherefore, I do not wish to be understood as to limit the scope of my invention to these modes of constructions alone, but reserve and claim the right to use all others which involves the same principle as herein shown and described, I have herein shown and described only what I now consider the best to use.

What I claim is:

1. In a door check, a resilient check fixed to the swinging end of a strap pivoted outside of the path of a swinging part and adapted to be swung into its path, a pivoted actuating member and means thereon engageable by said part and whereby to engage said strap so as to swing said check into the path of said part when the latter's movement is swift.

2. In a door check, a pivoted strap and a resilient check fixed to its swinging end normally suspended outside of the path of a swinging part and adapted to be swung into its path, and a pivoted actuating member having a striker adapted to be engaged by said part so as to swing said check into the path of said part when thereby the said striker is quickly hit.

3. In a door check, a pivoted actuating member and a striker fixed thereon adapted to be actuated by a swinging part, a resilient check fixed to the swinging end of a pivoted strap movable with said member, normally suspended outside of the path of said part and adapted to be swung into its path, and means on said member adapted to engage said strap so as to swing said check into the path of said part only when the latter's movement is swift.

4. A pivoted actuating member, means supporting said member, a striker fixed on said member extending into the path of and adapted to be actuated by a swinging part, a resilient check fixed to the swinging end of a strap pivoted outside of the path of said part and adapted to be swung into its path, means on said member whereby to engage said strap so as to swing said check into the path of said part when thereby said striker is quickly hit, a plate fixed on the edge of said part to engage said striker, guards for limiting the movements of said strap on its pivot, and stops to limit the movements of said member and check.

5. In a door check, a pivoted strap and a resilient check fixed to its swinging end normally suspended outside of the path of a swinging part and adapted to be swung into its path, a pivoted actuating member operatively connected with said strap and said part so as to swing said check into the path of said part, to check by recoil its closing movement, and to permit said check to remain outside of the path of said part when the latter's movement is slow; a plate on the edge of said part to engage said striker, guards on the pivot supporting said strap whereby to limit the latter's movements, so as to allow said check clear swing of the door jamb and the casing.

6. In a door check, a pivoted actuating member and a striker thereon adapted to be engaged by a swinging part, means supporting said member, a pivoted strap movable with said member, a check fixed to the swinging end of said strap normally suspended outside of the path of said part and adapted to be swung into its path by said member; a plate fixed on the edge of said part to engage said striker, and a casing inclosing said strap and check with openings for said check and member, and stops and guards for limiting the movements of said member and strap.

JOHN O. NASLIN.